United States Patent
Tixier

(10) Patent No.: US 9,415,852 B2
(45) Date of Patent: Aug. 16, 2016

(54) AIRSHIP, ANCHORING DEVICE, AND LANDING AND MOORING METHOD

(75) Inventor: Philippe Tixier, Boulogne Billancourt (FR)

(73) Assignee: DIRISOLAR, Boulogne Billancourt (FR)

( * ) Notice: Subject to any disclaimer, the term of this patent is extended or adjusted under 35 U.S.C. 154(b) by 402 days.

(21) Appl. No.: 14/233,293

(22) PCT Filed: Jul. 19, 2012

(86) PCT No.: PCT/FR2012/051710
§ 371 (c)(1),
(2), (4) Date: Jan. 16, 2014

(87) PCT Pub. No.: WO2013/011241
PCT Pub. Date: Jan. 24, 2013

(65) Prior Publication Data
US 2014/0158819 A1    Jun. 12, 2014

(30) Foreign Application Priority Data
Jul. 19, 2011    (FR) ...................................... 11 56557

(51) Int. Cl.
*B64B 1/00* (2006.01)
*B64B 1/20* (2006.01)
*B64B 1/66* (2006.01)

(52) U.S. Cl.
CPC . *B64B 1/005* (2013.01); *B64B 1/00* (2013.01); *B64B 1/20* (2013.01); *B64B 1/66* (2013.01); *B64B 2201/00* (2013.01)

(58) Field of Classification Search
CPC ............. B64B 1/005; B64B 1/66; B64F 1/12; B64F 1/16
See application file for complete search history.

(56) References Cited

U.S. PATENT DOCUMENTS

| 1,567,703 | A |   | 12/1925 | Broyles |
|---|---|---|---|---|
| 1,726,062 | A |   | 8/1929 | Gilman |
| 5,080,304 | A | * | 1/1992 | Stump ...................... B64F 1/16 244/100 R |
| 7,137,592 | B2 |   | 11/2006 | Barocela et al. |
| 8,991,754 | B2 | * | 3/2015 | Affre De Saint Rome .................... F16B 21/16 244/1 R |
| 2010/0038481 | A1 |   | 2/2010 | Wood et al. |
| 2010/0276546 | A1 |   | 11/2010 | Im |

(Continued)

FOREIGN PATENT DOCUMENTS

| DE | 41 32 718 |   | 4/1993 |   |
|---|---|---|---|---|
| FR | 589723 | A * | 6/1925 | ............. B64B 1/005 |

(Continued)

*Primary Examiner* — Brian M O'Hara
(74) *Attorney, Agent, or Firm* — Greer, Burns & Crain, Ltd.

(57) ABSTRACT

An air vehicle such as an airship is provided, having a rounded top portion, and the bottom portion of which has a substantially planar shape, including a region having a smaller inclination, which is referred to as a bottom surface, and the surface area of which is larger than that of an intermediate region having a greater inclination, referred to as an intermediate surface. The general shape produces, due to relative wind, a resulting overall downward force near the ground. The vehicle also includes a device for anchoring same to the ground, the anchoring device being stationary or controllable from the vehicle, located at the front portion of the vehicle, and projecting downward, in particular a ram including a portion which can be expanded by applying a bar against a translatably movable shoulder. Also included is a landing method implementing such a vehicle.

13 Claims, 8 Drawing Sheets

(56) References Cited

U.S. PATENT DOCUMENTS

2014/0158819 A1\* 6/2014 Tixier ..................... B64B 1/005
                                                             244/30
2014/0284423 A1\* 9/2014 Utsch ........................ B64F 1/22
                                                             244/110 E

FOREIGN PATENT DOCUMENTS

| FR | 2 581 962 | | 11/1986 | |
|----|-----------|---|---------|---|
| GB | 157198 A | \* | 2/1922 | .............. B64B 1/005 |
| GB | 259772 A | \* | 10/1926 | .............. B64B 1/005 |
| JP | 3-112799 | | 5/1991 | |

\* cited by examiner

Fig. 9a
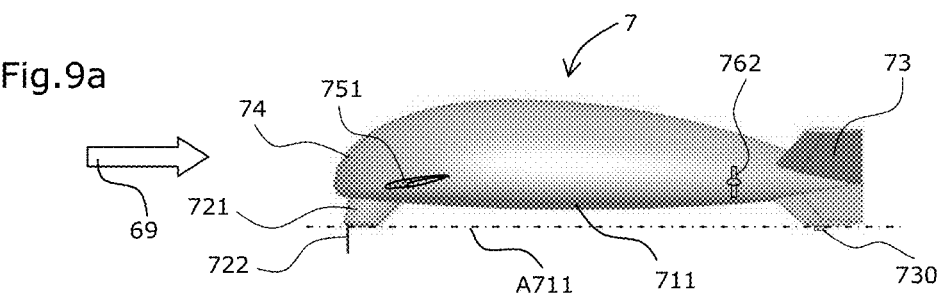
Fig. 9b
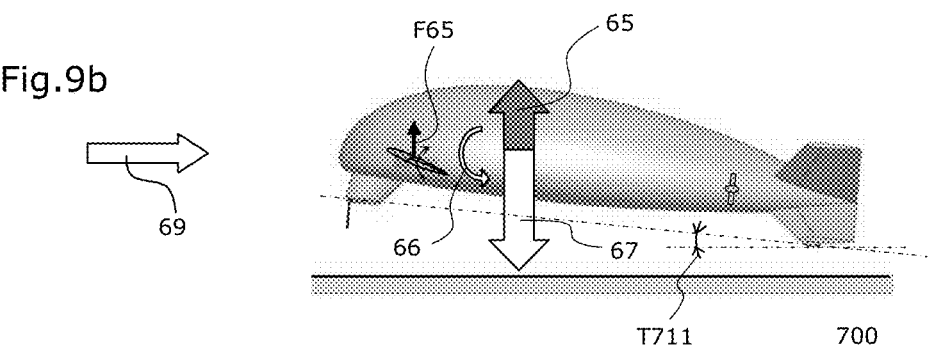
Fig. 9b2
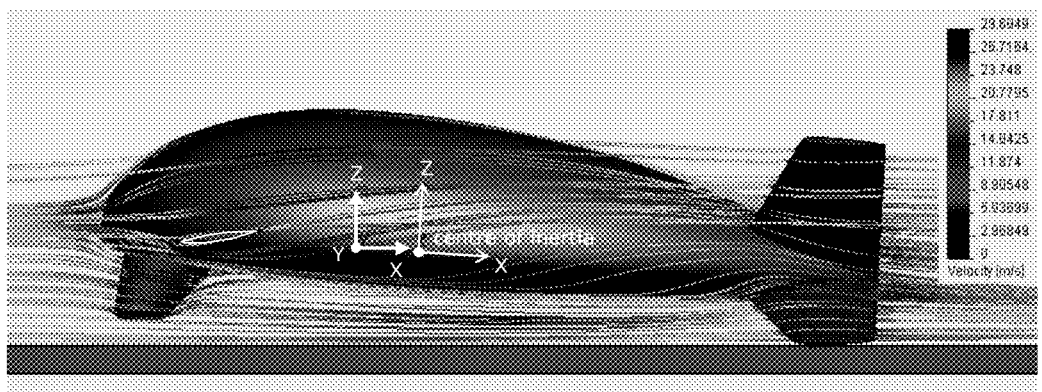
Fig. 9c
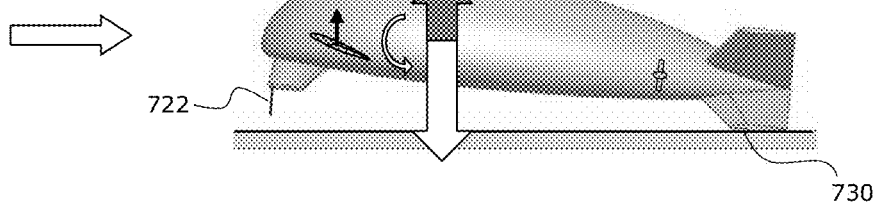
Fig. 9d
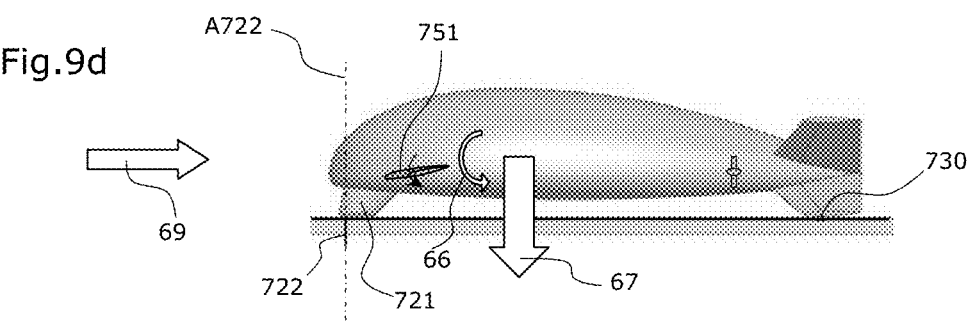

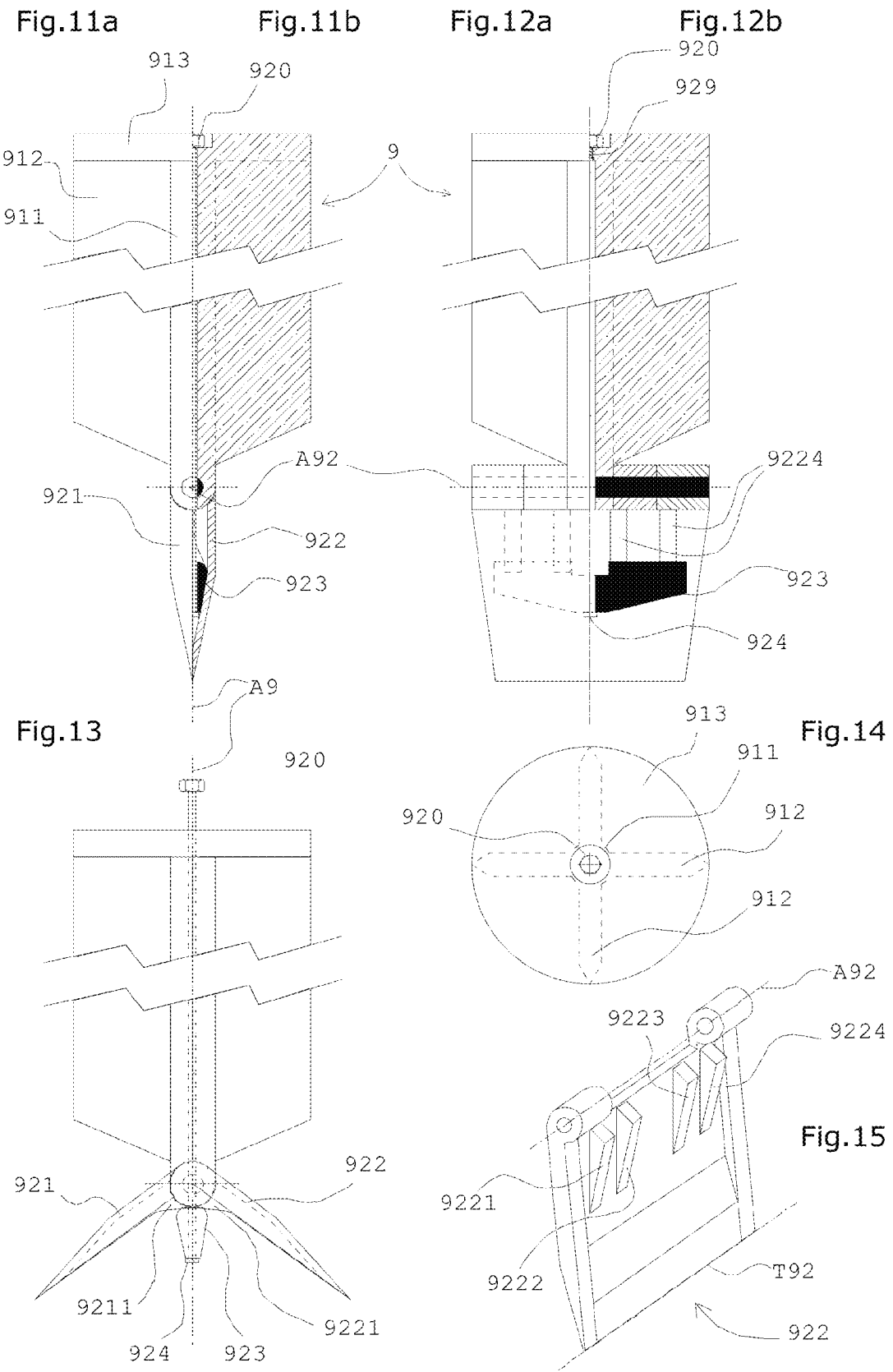

AIRSHIP, ANCHORING DEVICE, AND LANDING AND MOORING METHOD

BACKGROUND

The present invention relates to an aircraft of the airship type, which has a bottom face of flat shape and is of a general shape designed to produce, under the effect of relative wind, an overall downward resultant force when close to the ground. According to the invention, this aircraft further comprises a device for anchoring to the ground, fixed or maneuverable from said aircraft, which is located in the front portion of said aircraft and extends downwards, in particular a rigid fixing punch, comprising a part that is expandable by a ramp bearing against a nut displaced in translation.

The invention also relates to a method of landing using such an aircraft. This method comprises, under the effect of the downward force with compensation by maintaining a nose-up attitude, a descending flight until there is contact of a rear portion of the aircraft; followed by a decrease in nose lift until the anchoring device makes contact with the ground, in particular with the driving of a punch into the ground. Preferably, the method further comprises mooring, in particular by means of an expandable punch, while the aircraft is pinned to the ground under the effect of the downward force.

Among aircraft making use of the lift of a gas that is lighter than air, those equipped with propulsion are often called "airships".

Airships were used on a wide scale for several decades, for example during the first half of the twentieth century. Many projects are seeing the light of day again after several decades, for commercial uses such as for example advertising displays or the transportation of heavy loads, to take advantage of the many possibilities offered by this technology.

For example, this "lighter-than-air" technology allows slow or stationary flight, of long duration, without noise and without consuming energy for lift. It can use technology that is less complex and less expensive than in "heavier-than-air" aeronautics, constituted by aeroplanes and helicopters or hybrids thereof. This technology can also be used with little risk of mechanical failure and with a low degree of criticality in the case of accidents, since helium replaced hydrogen as the lifting gas.

Nevertheless, the piloting and maneuvering of an airship still pose a certain number of difficulties, some of which are connected with the large overall dimensions of the body that encloses the lifting gas, and therefore with the wind drag that its envelope represents.

Landing in particular is a difficult manoeuvre, which requires both good piloting skills and considerable assistance on the ground, in terms of equipment or in terms of personnel. In fact, when approaching the ground in non-zero wind conditions, an airship is subjected to irregular forces that cause considerable, unpredictable vertical lurching. These forces make a risk-free approach all the way to the ground difficult or impossible at wind speeds above the order of 20 km/h for a hot-air airship, and about 40 km/h for a helium airship in the real configurations that are currently used the most.

That is why it is always necessary to have the benefit of assistance on the ground. Now, as before, this assistance is most often provided by a team of several persons who grasp ropes coming down from the airship from a certain height, and then use them for bringing it to the ground manually or for mooring it to a mast by a winch. For example, a recent model of helium airship for twelve persons requires from three to eight persons and/or a mooring mast positioned on a lorry or anchored in concrete foundations.

Solutions have been proposed that consist of providing automatic attaching means on the ground, as in document EP 2 154 070 or document FR 2 581 962. Sometimes these solutions are still complex, and do not allow unassisted landing in a place that has not been prepared.

One aim of the invention is to remedy the drawbacks of the prior art, and in particular to facilitate the landing of an airship, for example in a place that has not been prepared and/or without assistance on the ground.

SUMMARY

Balloons without propulsion, or free balloons, generally have a gondola suspended from an envelope in the shape of a sphere or teardrop, which are the simplest and most compact shapes obtained on inflating a flexible envelope with a lifting gas, hot air or helium. Airships most often have an envelope of a shape that is elongated in the principal direction of movement, to facilitate their progress through the air. They generally have a circular cross-section, which optimizes the drag for a given volume.

To position itself at a given point in windy conditions, an airship is obliged to propel itself against the wind to obtain zero velocity relative to the ground. When it gets close to the ground, the airflow over the envelope of a balloon causes, by the Venturi effect, a negative pressure between the ground and the envelope, thus exerting a downward aerodynamic force on the envelope. However, at the end of the approach but before being sufficiently low to permit autonomous mooring or disembarkation, for example below ten to twenty meters for the bottom of the envelope, closing of this same zone between the ground and the envelope finally causes compression phenomena, which exert a torque and an upward force, thus opposing the downward force.

This upward force is exerted firstly on the front portion of the envelope, thus creating a pulling-up torque which alters the angle of attack and therefore the overall stability of the envelope, in an irregular and unpredictable way. Often, this change in angle of attack increases the lift of the envelope and tends to move the airship farther away from the ground. In certain cases, this pulling-up torque can thus increase of its own accord under the effect of the wind, creating an unstable situation that can sometimes even raise the airship to the vertical, or even overturn it completely.

Even once firmly moored on the ground, these forces can sometimes be enough to break or pull away this mooring, often leading to loss or destruction of the aircraft.

FIG. 1, FIG. 2, FIG. 3 and FIG. 4 illustrate the phenomena involved in the problem to be solved by the invention, and how they are taken into account in the invention.

The inventor has simulated and investigated the forces exerted on a spherical shape by a wind of 80 km/h (22 m/s) on a sphere with a diameter of 10 m, with wind from left to right in the figure, as illustrated in FIG. 1 but also on a substantially hemispherical shape with a flattened bottom as illustrated in FIG. 3.

For mapping the flow velocities, the dark zones above and below the sphere (tending towards red in colour mapping) indicate higher velocities ranging from 22 to 33 m/s. The dark zones situated in front of and behind the sphere (tending towards blue in colour mapping) indicate lower velocities ranging from 22 to 0 m/s.

FIG. 2 shows the evolution of the principal forces exerted by this wind on this sphere when it approaches the ground. The altitudes indicated on the x-axis correspond to the altitude of the bottom of the sphere above the ground. During the descent approach, from right to left of the curve, it can be seen that the overall resultant of the vertical forces (curve of lift/downward force, in blue) is downward, increasing regularly from 10 m (up to about −200 N for this sphere). It stabilizes in a fairly wide range between about 1.50 m and 0.50 m (between the two vertical dotted lines) before being inverted at the very end of approach (at about 20 cm). For its part, the total moment (nose-up/nose-down torque) exerted on the sphere is positive (nose-up) permanently and increases at the end of approach.

FIG. 4 shows the evolution of the same forces by the same wind of 80 km/h on a hemisphere, with flat bottom toward the ground, with an identical diameter of 10 m when it approaches the ground. In the first part of the approach (above 2 m) the drag and the downward force do not change much. However, the torque is always negative (i.e. "nose-down")

In the rest of the descent, it can be seen that the overall resultant of the vertical forces is downward and increases later (from 2 m) but also much more sharply up to a maximum of −600 N at around 0.30 m (on the vertical dotted line). This resultant force only turns upwards right at the end of approach, at around 0.20 m. For its part, the total moment (nose-up/nose-down torque) exerted on the hemisphere is negative (nose-down) on most of the approach, and only becomes nose-up at the very end of approach (at around 50 cm, on the vertical dotted line).

At first glance, this sudden triggering of a downward force nearly three times stronger would seem to be a considerable drawback for improving landing safety and stability, and would require more drastic manoeuvres with more powerful means.

Aircraft

However, to facilitate approach and landing, the present invention proposes an aircraft, of the powered airship type with at least partial buoyancy, preferably elongated in the principal direction of movement, characterized in that its external envelope has, stably at least in the landing phase, a bottom face of flat or very slightly curved shape, rigid and preferably situated below the level of the cockpit, for example with a radius of curvature more than ten or fifteen times greater than that of the top face, and for example in a region representing at least 75% of the silhouette of the aircraft in its horizontal projection.

This shape can typically be that of a horizontal half-teardrop with the bottom face flattened and substantially parallel to the ground, for example one or more ellipsoid portions in the upper portion.

This upper portion can comprise for example an ellipsoidal portion with aspect ratio of 2 at the front of the aircraft and with aspect ratio of 3 at the back, or a rear portion the aspect ratio of which is greater than that of the front by a factor with a value of about the square root of two, or other shapes described in the work "Airship Technology" by Gabriel Khoury, published in the Cambridge Aerospace Series by Cambridge University Press.

In the context of this definition, the present invention proposes determining the overall external shape of the aircraft more precisely, so as to obtain, under the effect of the relative wind, an overall resultant force directed towards the ground when said airship is in horizontal attitude and is distant from the ground by less than a specified distance.

Based on the above definition of shape, and as shown by the tests described in detail later, the general shape providing the functional characteristics defined here can be determined and optimized in various ways known in the prior art, for example by numerical or physical simulations.

It has already previously been proposed to make airships with a flattened bottom, for example in document US2010/0276546, which proposes a spindle shape tapered at both ends with a flat bottom and fins equipped with propellers fore and aft. However, very few of these shapes have ever been produced materially or in simulation, or possibly even none.

Moreover, it should be noted that such an effect of downward force with nose-down torque has never been found or envisaged previously. Nor is it not certain that a shape as tapered as that in document D1 could produce such an effect, and even less in conditions of stability compatible with the aims of the invention More particularly, the invention proposes an aircraft, the envelope of which has an upper portion that is rounded and a lower portion that has, at least for the front third of the aircraft and preferably for the front two thirds, a region with reduced inclination ("bottom" surface), the area of which is greater than or even much greater than that of the region with greater inclination ("intermediate" surface). For example, these two surfaces can be characterized by a ratio R21=S2/S1 having a value of at least 1 and preferably at least 1.2 or even at least 2, between on the one hand a surface (S2), called bottom surface, comprised within a second belt line (L2) defined by the points of tangency (T45) of the envelope with a plane (P45) inclined at 45° to the horizontal, and on the other hand a surface (S1), called intermediate surface, comprised between said second belt line (L2) and a first belt line (L1) defined by the points of tangency (T90) of the envelope with a vertical plane (P90).

In fact, in the lower portion of the envelope, under the effect of the wind and on approaching the ground, the portions nearest to the horizontal tend to be subjected to a downward suction action by the Venturi effect. In contrast, the oblique portions nearest to the vertical are also subjected to an upward action owing to the direct thrust of the wind.

By increasing the bottom surface relative to the intermediate surface, in particular on the side exposed to the wind, i.e. the front and optionally the side, it is thus possible to obtain the downward resultant force and the nose-down torque that make it possible to limit or avoid the "caisson" effect near the ground in windy conditions, and obtain the regular behaviour utilized by the invention to allow a controlled landing with little or no intervention on the ground, as well as safer parking once moored.

Thus, it can be seen that the inventor proposes accepting the drawbacks usually connected with a larger downward force, for example the risks of more violent impact or even of crash-landing. While accepting and reinforcing these apparently negative aspects, the invention proposes controlling the risks thereof in order to obtain better overall stability.

For this, the aircraft according to the invention comprises:

one or more elevators arranged for producing, under the effect of the relative wind, a nose-up angle sufficient to produce an upward lifting force, which will thus reduce or balance said overall resultant downward force, thus allowing the aircraft to approach the ground until there is continuous contact with the ground, in a controlled manner (for example at a chosen velocity of contact and at a chosen instant), in a position called ground position; and a device for anchoring to the ground, fixed or maneuverable from said aircraft, which is located in the front portion of said aircraft, with a geometry arranged for extending towards the bottom of the rest of the aircraft, in particular relative to the lowest element of the aircraft when the latter is in contact with the ground in an attitude where the overall resultant force is zero or directed downwards.

Preferably, this flat-bottomed shape of the aircraft is combined with the presence of at least one elevator, arranged so as to reduce or balance the overall resultant downward force in the landing phase, in the form of a movable aerodynamic control surface located forward of the centre of thrust of the aerodynamic drag of the aircraft.

This type of forward control surface, also called "canard", can have the drawback of making the aircraft more sensitive to maneuvering of the control surface. To date, it has never been used on airships. It is much used on small military aeroplanes and is generally regarded as difficult to pilot or even dangerous as it is naturally unstable, especially in a simple configuration without automatic control.

In the context of the invention, control surfaces of this type are nevertheless proposed, replacing or even supplementing the elevators that are usually installed in the tail unit. In fact, it makes it possible for example to obtain nose lift by raising the front rather than by lowering the rear, which broadens the range of possible manoeuvres and is particularly advantageous in the case of the invention.

The forward elevators moreover provide a torque effect which goes in the same direction as the vertical action exerted on the control surfaces. This effect makes piloting more intuitive and more direct, which combines advantageously with the other features of the invention to facilitate landing and mooring.

Preferably, the aircraft comprises one or more supporting sections that are able to rest on the ground, and extending from the bottom face of the envelope downwards over a sufficient distance to maintain the aircraft at a height from the ground above the height at which the overall resultant force will become lifting again. This height, called the inversion height, can be determined for example by physical or numerical simulation, as a function of the precise geometry and the specific dimensions of each aircraft.

Typically, a good position of the flattened bottom for anchoring the aircraft in the wind is thus at a height of about one to two meters above the ground. Referring to FIG. 4, the downward force is in this case still large, and is even greater than the horizontal drag, and these forces generate a nose-down torque, in such a way that the punch acting as the fulcrum remains implanted in the ground.

According to a preferred particular feature, the anchoring device comprises a pointed portion, called a punch, along an axis directed downwards so as to allow it to be driven into loose soil, in particular in a vertical direction, and is attached to the aircraft by connecting means arranged for maintaining an approximately constant angle between the aircraft and the axis of the punch during the landing phase.

According to another preferred special feature, the means connecting the punch to the aircraft are arranged to allow freedom of rotation of said aircraft about an axis that is vertical or transversal to the ground or the axis of the punch or between the two, which allows the aircraft to swivel when the wind changes direction.

Preferably, this freedom of rotation is combined with a rotational displacement about at least one horizontal axis, which allows the aircraft to follow the wind by swiveling without exerting force on the connecting means when the punch is not perfectly parallel to the axis of rotation of the wind, for example when the ground is not horizontal or when the wind exhibits vertical turbulence.

According to yet another preferred special feature, the punch of the anchoring device is equipped with retaining means situated in a portion of the punch that is driven into the ground, said retaining means comprising at least two elements movable between at least a position called retracted position, allowing said anchoring portion to be driven into loose soil; and a portion called expanded position, where the movable elements are moved away from the driving direction of said anchoring portion so as to exert a force that opposes withdrawal of said anchoring portion when the latter is driven into the ground.

Landing

According to the invention, landing of such an aircraft then comprises the following steps.

The approach typically begins with a descent towards the ground with a forward velocity that is not zero relative to the atmosphere, controlled for example by operating the elevators, adjusted to obtain a nose-down angle that gives a downward aerodynamic resultant force.

This descent is continued as far as a distance from the ground at which the relative wind speed exerts on the airship, even in neutral attitude, an overall resultant force directed towards the ground, called downward force.

The elevators are then operated so as to obtain a nose-lift angle, producing lift that compensates the downward force.

By compensating this downward force completely, it is then possible to maintain stationary flight near the ground, motionless or with controlled movement relative to the ground.

By compensating this downward force partially, descending flight is then obtained, until a rear portion of the airship makes contact with the ground. According to a currently preferred special feature, the propulsion is adjusted to end with low or zero horizontal velocity relative to the ground during descent and at the time of contact.

The elevators are then operated so that a reduction of the nose-lift angle is gradually obtained, until a front portion of the airship makes contact with the ground under the effect of this downward force.

The front then remains pinned to the ground under the effect of the wind, and it is thus possible to proceed with mooring the front of the aircraft to the ground, for example from inside the aircraft.

Comments on the Prior Art

It should be noted that asymmetric shapes with a flattened bottom have sometimes already been proposed in the past, with a flat base for various reasons, unconnected with the problems of manageability during landing. Moreover, they have probably not been made or tested so far.

For example, document JP 3 11 2799 proposes a remote-controlled balloon comprising a rigid bottom that is flattened for better withstanding cross-winds.

Document EP 1 600 370 proposes a development based on a principle of aviation, as a hybrid aircraft having the shape of an aeroplane wing with aerodynamic lift and with its weight reduced by filling it with a lifting gas.

Document DE 41 32 718 proposes a balloon of horizontal half-lens shape without a gondola, and with its bottom flattened to allow landing gear to be fitted there and to reduce the distance from the ground during mooring to a fixed mast on the ground.

Thus, the possibilities of a shape with a flattened bottom for facilitating descent and landing do not appear to have been identified before now.

The combination of features proposed by the invention, as well as the method of landing proposed by the invention, which is made possible by these features, thus provide unexpected advantages. These advantages can represent an important contribution to the design and use of airships, in particular with a crew limited to the persons on board, and which can be capable of setting down on terrain that has not been designated and/or prepared.

Advantages of the Flat Bottom Near the Ground

A sphere, placed in the wind, is forced downwards towards the ground when it gets near to the ground (as illustrated in FIG. 1) but it is subjected to various forces that have an adverse effect on stability and anchoring.

Passage of the wind under the sphere produces an effect of local compression between the ground and the sphere, sometimes called "caisson effect", which tends to oppose the downward force. This "caisson" effect can be irregular, and its antagonism with the downward force might help to explain the sudden lurching encountered by the pilots of airships close to the ground.

The sphere is moreover subjected to a pulling-up torque, which tends to raise the front of the sphere and thus opposes any descent and landing manoeuvre.

In the case of an elongated balloon of cylindrical cross-section, this lifting of the front will moreover cause additional dynamic lift due to the wind, and will therefore tend to move it away from the ground and pull out the anchoring.

The invention exploits an unexpected effect, so far unexploited, of a flat-bottomed shape, in that it proposes combining this shape with a way of utilizing this effect and with special features, which make it possible to utilize this effect in an effective and practical manner during a landing manoeuvre, i.e. to utilize the wind for aiding landing rather than allowing it to oppose landing.

In fact, as stated above, a hemispherical airship, flattened underneath, which is placed in the wind and approaches the ground, is effectively forced downwards towards the ground. However, the development of the downward force is different compared to a sphere, possibly because of a greatly reduced "caisson" effect. This downward force is stronger but also more stable than in the case of the sphere, which greatly facilitates the manoeuvre of approach to the ground provided the aircraft has the appropriate characteristics and uses a suitable method.

Moreover, the torque acting upon the airship with a flattened bottom remains nose-down constantly throughout the descent phase and until landing. It thus tends to lower the front permanently and pin it to the ground, which aids landing, anchoring and then mooring.

Moreover, in the case of an elongated airship, the nose-down torque caused by the wind tends to bring the airship naturally to a pitch-down attitude, which increases the dynamic downward force exerted by the wind and aids in guiding and holding the airship on the ground.

It can be seen that the shape of the aircraft according to the invention makes it possible to obtain better stability and better manageability during the approach and descent phase, but also to obtain a stable and constant tendency of the aircraft to remain pinned to the ground during landing and while parked.

Interaction with the Anchoring Device

The presence of an anchoring device under the front of the airship makes it possible to benefit from this constantly downward-acting resultant force which guides and then pins the front to the ground. Under the effect of this downward force, this anchoring device under the front of the airship comes into contact with the ground naturally and then rests permanently on the ground. It is therefore possible to fix this anchoring device on the ground with simple mooring means, which have to withstand little if any upward pulling forces if a wind is blowing. The main forces to be withstood then consist of horizontal forces, associated with a downward compressive force which is absorbed by the ground by compression.

Numerous mooring means are then available for withstanding these horizontal forces, and they are often even aided by the presence of the downward force.

As the overall resultant force is a downward force, stability and a certain immobility are thus provided once the anchoring device is in contact with the ground. It is therefore possible for someone on board the airship to come close to the ground and make the definitive mooring firmer. For example, the pilot can leave the controls and undertake the mooring himself.

For example, on firm ground, it may be sufficient to insert an eye-bolt or a drive-in peg provided with a ring for fixing a snap hook connected to the anchoring device.

For example, in the case of loose soil, it may be sufficient to allow a pointed portion of the anchoring device to be driven into the ground under the effect of the downward thrust of the aircraft or the descending inertia of the aircraft. This driving can then be reinforced for example with blows of a mallet by the pilot, who remains on board.

It can be seen that the general shape of the aircraft, associated with the approach manoeuvre, is combined advantageously with the anchoring device to allow facilitated landing and mooring, and may make any material or human presence on the ground partially or even completely unnecessary. It thus becomes possible to use such an aircraft much more simply and more flexibly, for free movements without infrastructure, for example for flights of exploration or improvised cruises to landing places not designated in advance.

Elimination or Reduction of Ground Facilities

In particular, there is no longer any need to mobilize a team at the place of arrival. There is no longer any need for a mast such as those that are currently anchored on the ground or on a lorry. It becomes possible to set down and park almost anywhere.

Provided the needs for fuel and provisions are met, there is complete autonomy of the team on board, for example for long and distant missions.

Passengers of tourist flights, even when solo, can have almost total freedom for setting down and visiting points of interest on the ground.

Performance Characteristics

As an example, exploiting the possibilities of the invention, a projection is described below for a small aircraft for two persons, complying with the French standards of the regulatory category of machines of the Ultra Light Motorized (ULM) type.

In the context of this projection, estimation of the possibilities and performance gives the following values:

Maximum speed of the airship: 80 km/h,

Continuous cruising speed: 60 km/h,

Surface wind permissible during operation: 80 km/h,

Landing and mooring possible by the pilot alone without assistance on the ground, Parking on the ground without infrastructure with wind up to 140 km/h.

It should be noted in particular that this flexibility of use as well as the range of meteorological conditions offer very interesting advances relative to the current possibilities according to the prior art, and are sufficient to allow radical development of the possibilities of use and of the industrial and commercial markets for this type of aircraft.

BRIEF DESCRIPTION OF THE DRAWINGS

Other advantages and characteristics of the invention will become apparent on examination of the detailed description of an embodiment which is in no way limitative, and the attached diagrams, in which:

FIG. 9a to FIG. 9d are profile views showing the aircraft in FIG. 7 in five successive positions during a landing procedure according to the invention;

FIG. 11a and FIG. 11b are two lateral half-views, in external view and sectional view, of the punch in FIG. 10, seen from the side in the closed position;

FIG. 12a and FIG. 12b are two lateral half-views, external view and sectional view, of the expandable punch in FIG. 10, front view in the closed position;

FIG. 13 is a side view of the expandable punch in FIG. 10, seen from the side in the open position;

FIG. 14 is a top view of the expandable punch in FIG. 10, seen from the side in the closed position;

FIG. 15 is a perspective view of one of the anchoring plates of the expandable punch in FIG. 10;

DETAILED DESCRIPTION

Figure 3:
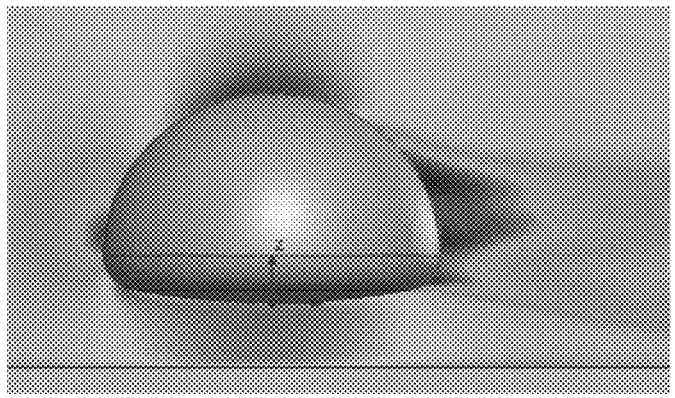
FIG. 3 is a mapping of the results of numerical simulation indicating the flow velocities of the air from left to right around a sphere with a flattened bottom, near the ground.
Figure 4:
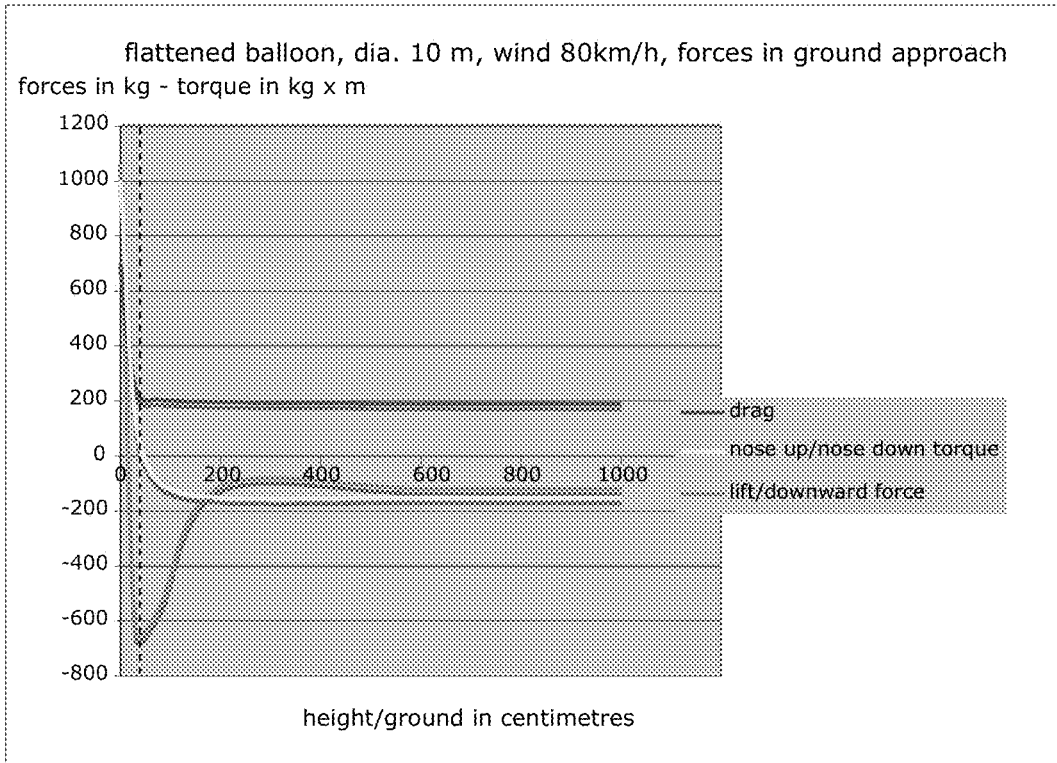
FIG. 4 shows three curves illustrating the variation of several forces that are applied to the sphere with a flattened bottom in FIG. 3 as a function of its height relative to the ground.
Figure 5:
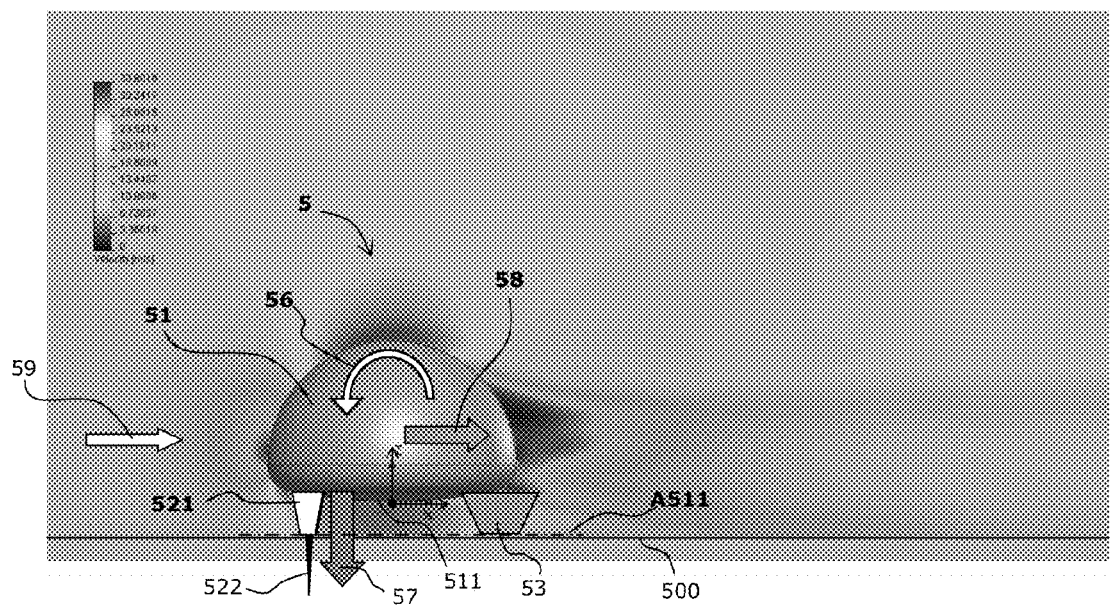
FIG. 5 is a schematic diagram based on the numerical simulation in FIG. 3, illustrating the wind forces applied on an aircraft according to the invention in a configuration as a hemisphere with a flattened bottom with vertical front punch.

FIG. 5 shows an aircraft 5 according to the invention comprising the hemisphere 51 of FIG. 3 and FIG. 4 as general external shape for its envelope. The underneath of the aircraft is equipped at the front (on the left of the figure) with a rigid anchoring device 52, and at the back with a supporting portion 53, for example part of the tail unit or a supporting skid.

The various arrows show schematically the directions of the wind 59, of the drag force 58, and of the downward force 57 exerted by the wind on approaching the ground with its nose-down torque 56, represented by an arrow in the direction of the action exerted on the aircraft.

The anchoring device comprises a supporting portion 521 which extends or is flush with the bottom relative to the rest of the aircraft, beneath the axis A511 of the lowest points of the aircraft, especially when the latter is in neutral attitude at the end of ground approach.

Under this supporting portion there is mounted a pointed portion, called punch 522, along an axis directed downwards so as to permit driving into loose soil 500, for example in a direction transverse to the ground or even approximately vertical.

Preferably, this anchoring device 52 is connected to the structure of the aircraft 5 by connecting means arranged for maintaining, during the landing and initial anchoring phase, a constant angle between the aircraft and the axis A522 of the punch relative to the aircraft. Such a punch thus allows a first direct anchoring by driving into the ground under the effect of the resultant downward force alone.

Figure 6:
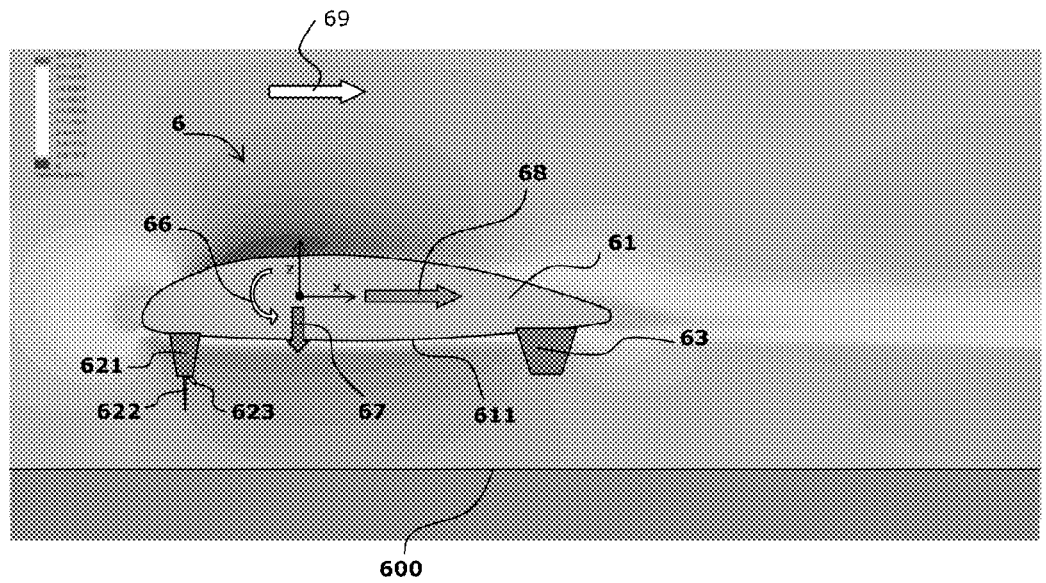
FIG. 6 is a schematic diagram based on a mapping of numerical simulation of the flow velocities of the air around a teardrop shape with a flattened bottom near the ground, illustrating the wind forces applied on an aircraft according to the invention in a configuration as a teardrop with a flattened bottom with vertical front punch and rear support.

FIG. 6 shows an aircraft 6 according to the invention comprising an envelope 61 having a general teardrop external shape for its envelope with a flattened bottom 611 approaching the ground 600. The aircraft is equipped with the same types of devices as that in FIG. 5: a rear support 63, a rigid anchoring device 62 at the front (on the left of the figure) comprising a supporting portion 621, punch 622 as well as attaching means such as a snap hook 623.

The bottom of FIG. 6 shows a mapping of numerical simulation of the flow velocities of the air around the envelope 61. The dark zones above and below the envelope (tending towards red in colour mapping) indicate higher velocities ranging from approximately 22 to 28 m/s. The dark zones situated in front of and behind the envelope (tending towards blue in colour mapping) indicate lower velocities ranging from approximately 22 to 10 m/s.

Description of an Example of an Aircraft

Exploiting the possibilities of the invention, an example of a small aircraft for two persons is described here, complying with the French standards of the regulatory category of machines of the Ultra Light Motorized (ULM) type, in its preliminary definition.

In this context, such an aircraft is envisaged with the following characteristics:
- Rigid shell, with cells containing helium without increased pressure
- On-board energy: batteries+photovoltaic panels
- Stabilizers and Controls Adopted
- Four fixed tail units, in X configuration, for their quality as stabilizers, and in particular providing vertical stabilizer function;
- Three propellers: 2 for forward and yaw, 1 for lift;
- Pitch control with two forward control surfaces called "canard", preferably coupled together;
- A retractable punch behind the anchoring cabin;
- Longitudinal displacement of the batteries for correcting attitude in flight, and ballasting of the back on the ground.

Typically, this aircraft is provided with positive buoyancy with zero wind, and possibly with a shape with positive or zero lift far from the ground and for example beyond 10 m.

Figure 16:
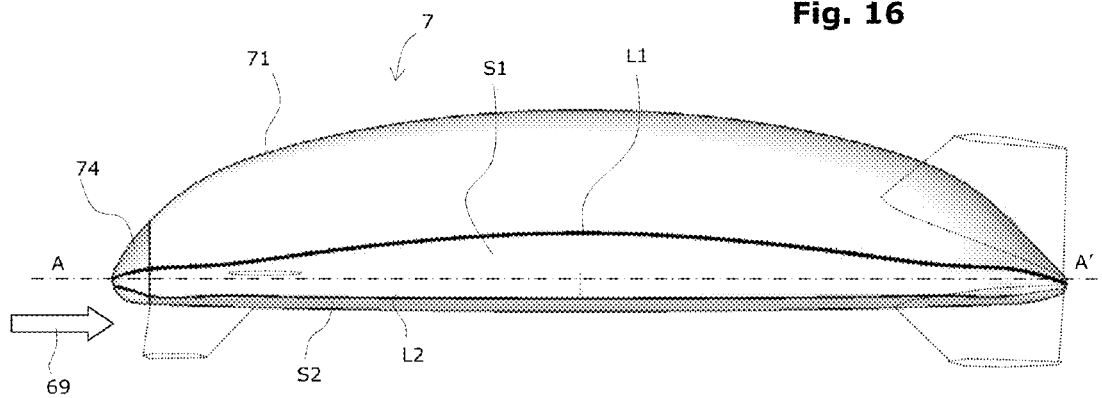
FIG. 16, FIG. 17 and FIG. 18 are simplified views of the envelope of an aircraft according to the invention, illustrating a definition of the surfaces contributing to the required aerodynamic effect, respectively side view, front view and perspective view underneath from the front.
Figure 17:
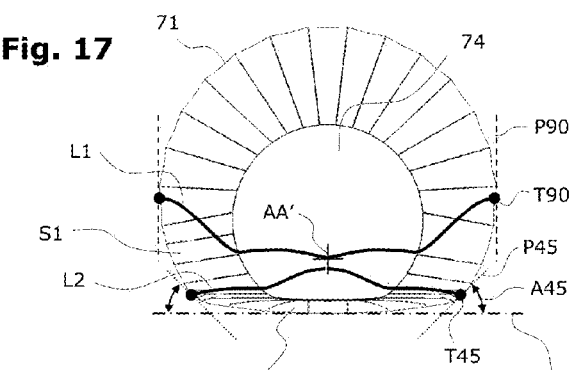
Figure 18:
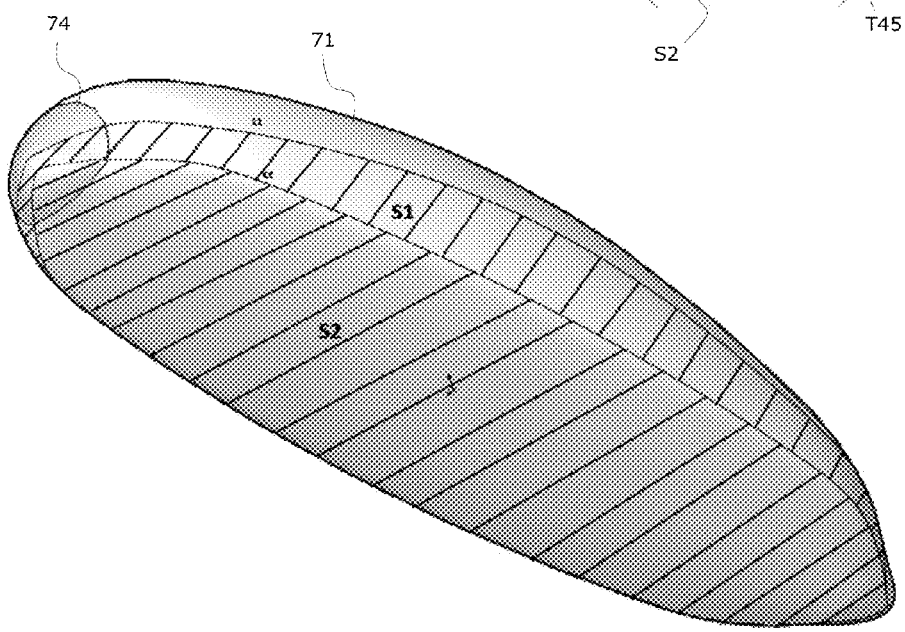

FIGS. 16 to 18 show a more precise way of defining the conditions of shape relating to the lower and intermediate surfaces, assuming the envelope 71 to be at an angle of attack where its line AA' of greatest length is horizontal, or at least parallel to the wind.

All around the envelope, the first line called first belt line L1 is defined by the succession of points of tangency T90 between the envelope and a vertical plane P90.

The second belt line L2, or intermediate belt line at 45°, can be defined by the succession of points of tangency T45 between the envelope and a plane P45 inclined relative to a horizontal plane P0 by an angle A45 of 45°.

An surface S1 called intermediate surface can be defined and calculated between the two belt lines L1 and L2, and which must be sufficiently lower or even considerably lower than the bottom surface S2 that is contained within this intermediate belt line L2.

The angle of inclination A45 used here for defining the intermediate belt line L2 is 45°, but other angles close to this could nevertheless be used, for example between 40° and 60°, while keeping the same principle and with corresponding adjustment of the ratio of the two surfaces S2 and S1.

FIGS. 7 to 15 illustrate certain features of the invention in more detail, as an example in the context of a definition of aircraft 7 according to the invention in the ULM version, in a configuration with an envelope 71 in flat-bottomed teardrop shape 711 oriented in the direction of forward motion.

Figure 7:
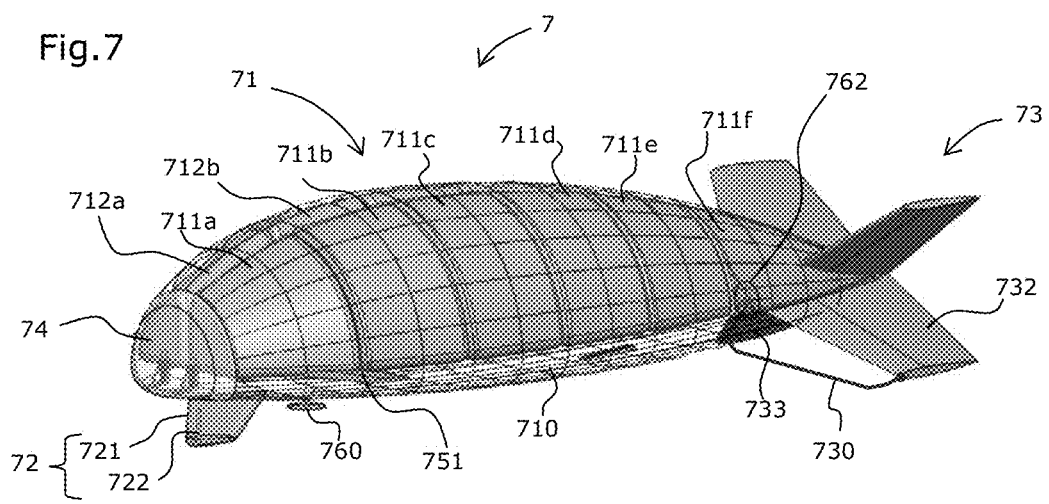
FIG. 7 is an exploded view showing an aircraft according to the invention in a configuration with a flat-bottomed teardrop shape optimized by numerical simulation, with a rigid tubular frame containing two laterally symmetric longitudinal rows of several ballonets in shape, with dynamic elevators forward, and with a mooring station with a descent well under a front cockpit.

As can be seen from FIG. 7, this aircraft comprises two horizontal swiveling elevators 751 distributed on either side of the front of the aircraft, for example coupled together.

This aircraft also comprises a stabilizer tail unit 73, in Saint Andrew's Cross configuration in the present example, which has a bottom supporting structure 730 arranged to allow transverse sliding of the back of the aircraft on the ground, during parking avoidance under the effect of a change in orientation of the wind. This supporting structure can be for example adjustable skids fixed to the lower tail units or a bar curved downwards joining together the two lower tail units, left 732 and right 733.

This aircraft 7 comprises a front cockpit 74, communicating with a mooring station 72 or anchoring cabin. This mooring station comprises a rigid descent well 721 serving as supporting portion for the aircraft. It includes an anchoring device including a vertical mast that is retractable and lockable, free to rotate and bearing a punch 722 directed downwards as well as an attaching device 723.

This anchoring cabin can also communicate with the exterior to allow human disembarkation and/or embarkation of the aircraft when it is in its ground position, for example via a door 803.

This mooring station is arranged sufficiently close to the anchoring or mooring means 722 and 723 to allow a person to touch the ground at the anchoring point without disembarking from the aircraft. It is thus possible to verify or complete the anchoring before disembarking, or to release or reduce the anchoring after going on board. It is thus possible to limit the risks of taking off without the pilot, for example if the pilot had disembarked during complementary manoeuvres of mooring or unmooring.

The body 71 of the aircraft is formed mainly by a rigid frame 710 as a lattice of tubes bearing two lateral rear engines 762 for horizontal propulsion and optionally a vertical engine for correction of attitude 761 under the front portion.

Figure 8:
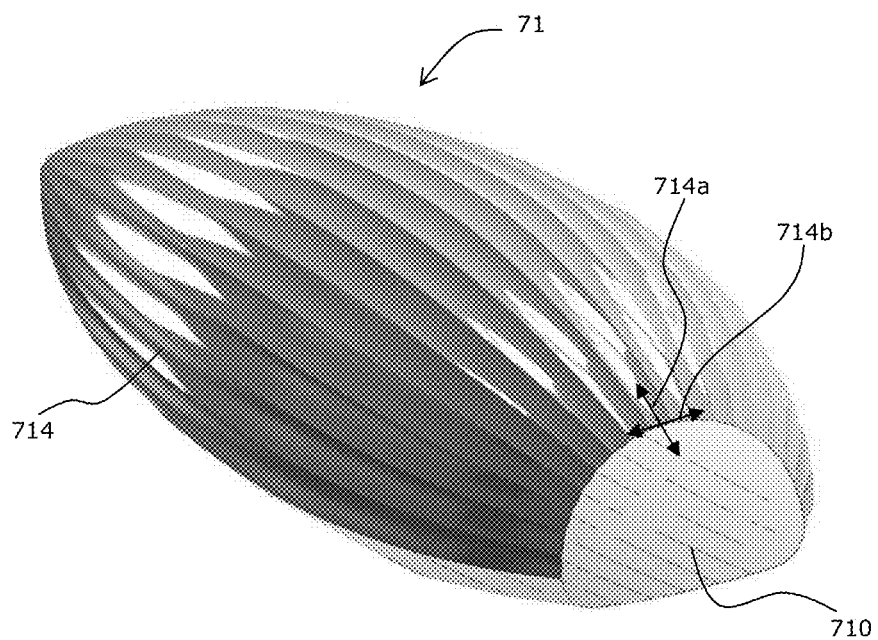
FIG. 8 is a perspective view of the covering of the aircraft in FIG. 7.

As illustrated in FIG. 8, the lattice structure is covered with a covering 714 of light cloth, maintained under tension in two different directions 714a, 714b. The rigid structure 610 contains two laterally symmetric, longitudinal rows 712, 713 of several ballonets in shape 712a-712f, filled with helium, the plurality of ballonets providing better lateral and longitudinal stability. Moreover, the rigid structure makes it unnecessary to put the helium ballonets under increased pressure, and therefore greatly reduces leakage of helium from the ballonets.

As described in detail later, referring to FIG. 10, the punch is movable between:
- a retracted position in which the driving portion extends less or not at all from underneath the front portion of the aircraft, thus limiting the overall dimensions and the risks of collision of the point;
- an anchoring position in which it extends from the aircraft sufficiently to permit anchoring by driving in during the landing phase.

This anchoring position can also have several more or less extended positions, for example one slightly extended for direct initial anchoring during first contact, and another driven in more deeply for more complete mooring.

As can be seen from FIG. 11 and FIG. 12, the body 91 of the punch 9 comprises a body 91 ending in a pointed or tapered portion 92. It also comprises an expandable portion including two elements 921, 922 movable between:
- a retracted position (FIG. 11) not extending beyond the section of the punch transversely to its direction of driving; and
- an expanded position (FIG. 13) allowing them to bear against the ground upwards.

These movable elements are brought into the expanded position by four ramps 9221-9224, carried by each of the plates, bearing against a nut 923 displaced along axis A9 by translation means.

The movable elements comprise two movable plates 921, 922 joined together by a swivel linkage along an axis A92 transverse to the driving axis A9. They are moved apart by the upward movement of a nut 923 moved in translation by a control rod 920 provided with a hexagon head. This control rod 920 comprises a threaded rod operated by a hexagon head. This rod passes through the nut and moves it upwards by a forming collar 924. For this, it interacts by a screw-nut mechanism with the body 91 of the punch, for example by a thread 929 located in the upper portion to allow easy operation and simpler maintenance thereof.

These two movable plates 921, 922 have free ends that meet together, in their retracted position, in alignment on at least one cutting line T92. They then have a shape comparable to the blade of a shovel, and thus form a driving end for the pointed portion 92.

As can be seen from FIG. 11 and FIG. 12, the body 91 of the punch 9 comprises a cylindrical central portion 911 surrounded by several fins 912 parallel to the direction of driving A9, which reinforce the rigidity of the punch by limiting the cross-section of ground to be displaced during driving. These fins are surmounted by a vertical cylindrical head 913, which stiffens the assembly and can withstand shocks for completing the driving. This punch head 913 comprises a housing for protecting the threaded rod 920.

Description of an Example of Landing Procedure

An example of procedure for landing and mooring by the pilot alone has the following steps:
- the pilot brings out the "punch" 722, at least partially, before initiating the descent towards the ground;
- the pilot adjusts the propulsion to obtain a zero or low horizontal velocity relative to the ground;
- he starts and then controls the descent by acting upon the elevators 751 of the "canard" type, until contact with the ground is obtained at the rear 730, then at the front by the anchoring cabin;
- checking the efficacy of anchoring by reducing the propulsion;

the pilot goes down into the anchoring cabin 722;

in the case of hard ground: without disembarking, the pilot prepares the fixed point and attaches the aircraft to it by a snap hook 723;

in the case of loose soil: without disembarking, the pilot completes the anchoring, by a mechanical anchorage and/or anchoring with ballast, if possible for a pulling-out force with a value greater than or even much greater than its weight, in particular for the case with zero wind;

then the pilot disembarks, and can ballast the front additionally to ballast the total weight that is to disembark;

optionally, the batteries are pushed back fully on a sliding guide for ballasting and stabilizing the rear;

optionally, the rear skids are positioned transversely to facilitate avoidance rotation.

The passenger or passengers can then disembark; the pilot can check the mooring and deactivate the systems before leaving the parked aircraft.

An example of procedure for take-off by the pilot alone can have the following steps:

the pilot checks that the machine is in good order;

weighing the passengers, adjustment of the front ballast if required;

returning the rear skids to the flight position;

embarkation of the passengers, with the batteries brought back to the flight position;

unballasting of the front, recovery of the anchoring in hard ground if required;

if there is significant wind, operating the propulsion to neutralize the drag;

if necessary, leverage against the ground to extract the punch from the ground, then action on the canard control surfaces, or on the lift control, to raise the front;

ascent to more than 10 meters into the wind, then complete retraction of the punch.

FIGS. 9a to 9d illustrate a landing procedure for an airship according to the invention in more detail.

Initiating Descent:

FIG. 9a: the aircraft 7 approaches the ground during descent, with propulsion 762 adjusted into the wind 69 to obtain zero velocity relative to the ground. This descent is initiated and maintained, in particular, by operating the elevators 751 adjusted downwards to obtain a nose-down angle giving a downward aerodynamic resultant.

On reaching a certain height from the ground 700, the relative wind speed 69 exerts an increasing downward force 67 on the airship (cf. FIG. 4). As the descent proceeds, the pilot compensates this increase to control the descent, by bringing the elevators 751 back to a position that would correspond to a neutral attitude at a cruising altitude far from the ground.

Controlling the Descent by Nose Lift:

FIG. 9b: continuing the descent, the downward force 67 exerted by the wind increases further. The pilot continues to compensate this increase to control the descent, by orienting the front elevators 751 to cause an action F65 which increases the angle of attack T711 of the bottom face 711 of the airship.

Setting to this nose-up angle of attack causes additional lift 65, which makes it possible to compensate the effect 67 of the downward force such as would be exerted on the airship in neutral attitude. By adjusting this nose lift, the pilot can thus control the descent precisely. He can also suspend it completely and remain in horizontal or even stationary flight.

Figure 1:
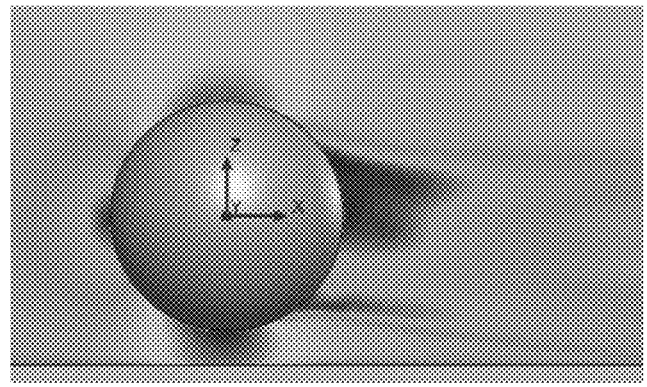
FIG. 1 is a mapping of the results of numerical simulation indicating the flow velocities of the air from left to right around a sphere near the ground.
Figure 2:
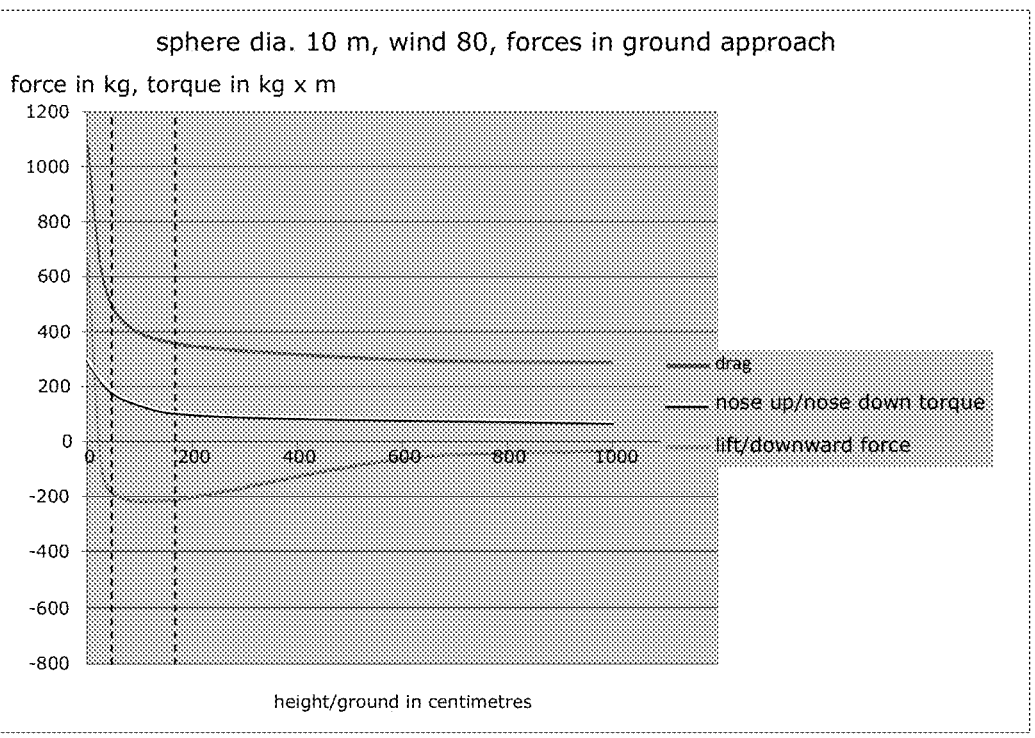
FIG. 2 shows three curves illustrating the variation of the forces that are applied to the sphere in FIG. 1 as a function of its height relative to the ground.

FIG. 9b2 is a numerical simulation, in a situation where the rear of the aircraft will come into contact with the ground (difference about 1 cm), established for an aircraft with a volume of 900 m$^3$ in a wind of 80 km/h, in an attitude forming an angle of attack of 3.5° relative to the neutral attitude in cruising flight.

The following table gives the values calculated for the resultant of the aerodynamic forces and torques exerted on the aircraft:

| Goal Name | Unit | Value | Averaged Value | Minimum Value | Maximum Value |
|---|---|---|---|---|---|
| SG Force 1 | [N] | 1822 | 1822 | 1820 | 1830 |
| SG X - Component of Force 1 | [N] | 1650 | 1650 | 1650 | 1651 |
| SG Y - Component of Force 1 | [N] | 43 | 44 | 41 | 48 |
| SG Z - Component of Force 1 | [N] | −771 | −771 | −789 | −765 |
| SG X - Component of Torque 1 | [N * m] | −58 | −56 | −72 | −49 |
| SG Y - Component of Torque 1 | [N * m] | 4905 | 4932 | 4856 | 5191 |
| SG Z - Component of Torque 1 | [N * m] | 72 | 79 | 23 | 121 |

Iterations: 708
Analysis interval: 106

In the order given in the table, these components break down as follows:

Aerodynamic Forces:

SG X—Component of Force 1: component Fx along axis X, or the drag (intensity: 1650 N)

SG Y—Component of Force 1: component Fy along axis Y, lateral thrust (slight: artifact of calculation due to the iterations)

SG Z—Component of Force 1: component FZ along axis Z, or a resultant force of the downward force type (intensity: −771 N i.e. downwards)

Aerodynamic Torques:

SG X—Component of Torque 1: torque Mx about the axis X, rolling torque (slight: artifact of calculation due to the iterations)

SG Y—Component of Torque 1: torque My about the axis Y, nose-down torque 66 (intensity: 4905 Nm)

SG Z—Component of Torque 1: torque MZ about the axis Z, yawing torque (slight: artifact of calculation due to the iterations)

As can be seen, the resultant force is certainly oriented downwards, even with an angle of attack that makes it possible to keep it at a low enough value (771 N) to allow controlled contact without damage.

The resultant torque is obtained from the combination of the various components applied on the aircraft, which include in particular: the nose-down torque 66 due to the shape of the envelope, the pulling-up torque caused by the action F65 of the canard control surfaces 751 and potentially of the angle of attack itself, as well as the stabilization effect of the tail unit 73. As can be seen, the resultant non-zero value (4905 Nm), in the direction of nose lift (positive), even in the case of a nose-down position of the control surfaces 751 (calculations performed for a position of the canard at −11.5° relative to the aircraft) indicates that it is possible to obtain a further increase in the angle of attack, and therefore that the rear 730 of the aircraft comes effectively into contact with the ground.

Contact with the Rear:

FIG. 9c: Thus, by maintaining a controlled descending flight with a nose-up angle of attack, the rear support crossmember 730 of the airship finally comes into contact with the ground 700.

The pilot then operates the elevators 751 so as to obtain a reduction of the nose-lift angle T711, until contact of the front portion of the airship with the ground is obtained under the effect of this downward force 67, the effect of which is then also reflected in a nose-down torque once the rear is supported by the ground.

As the nose lift decreases, the total downward force increases once more and combines with the nose-down torque (aerodynamic and resulting from the contact of the rear), pressing the front to the ground. The pilot can use the control surfaces 751 in the direction for pulling up (for example at an angle of attack of the order of 40°) to continue to compensate F65 this force and control the contact of the front with the ground.

Contact with the Front and Initial Anchoring:

FIG. 9d: In contact with the ground, returning the control surfaces 751 to the direction for nose-dive, the front is then pinned and held to the ground with a large force, which can be of the order of 6000 N for the same aircraft.

In the case of loose soil, the punch 722 will be driven into the ground 700 under the effect of the total downward force 67 that is present with the airship in the position on the ground. It can be seen that the anchoring cabin 721 carrying the punch extends below the bottom surface 711 sufficiently to prevent the airship 7 going down lower, and thus prevent it leaving the range of height in which the resultant 67 is downward (around 20 cm in FIG. 4) and the torque 66 is nose-down (about 50 cm in FIG. 4), or range of downward force: to the right of the vertical dotted line in FIG. 4.

As the front is pinned against the ground, the situation of the airship is stable and thus allows prolonged parking, if necessary compensating the drag 68 by means of the propulsion 762.

It is then possible to release and/or lock the controls to proceed to additional mooring of the front of the aircraft on the ground, for example by driving the punch 722 in deeper, or by driving an attachment eye-bolt into the ground if it is hard ground. Once mooring has been carried out, it is then possible to switch off the propulsion and leave the aircraft completely.

It should be noted that the entire manoeuvre can be envisaged without vertical engine attitude correction 761 if there is a significant wind.

It should be noted that the pilot's various actions on the elevators 751 for initiating and then controlling the descent as well as the contacts of the front and rear are in the most instinctive direction for actuating the control surfaces relative to the movement of the aircraft, which limits the complexity and the risks of the operation.

For the various adjustments of angle of attack of the envelope, and in particular slow adjustments or with slight wind, the elevators 751 can moreover be assisted by adjustments of position of the centre of gravity, for example by longitudinal displacement of the electric storage batteries.

In this parking position (FIG. 9d), as the resultant 67 is still directed downwards, mooring mainly opposes the drag force 68 parallel to the ground. The anchoring device 72 allows free rotation about the anchoring point, which allows the airship to "dodge" in order to follow the direction of the wind. This rotation is made possible by swiveling about the axis A722 of the punch, or a vertical axis bearing mooring means 723.

In the case of loose soil, the anchoring device 72 holds the airship simply by maintaining a constant angle between the axis A722 of the punch and the ground, which prevents said punch being pulled out of the ground and allows it to oppose the drag 68. In the case of hard ground, a snap hook for attachment 723 may be sufficient to hold the airship without pulling out the eye-bolt.

FIGS. 10 to 15 illustrate in more detail an example of an aircraft according to the invention as described with reference to FIG. 7 in a configuration with retractable and expandable punch.

Figure 10A:
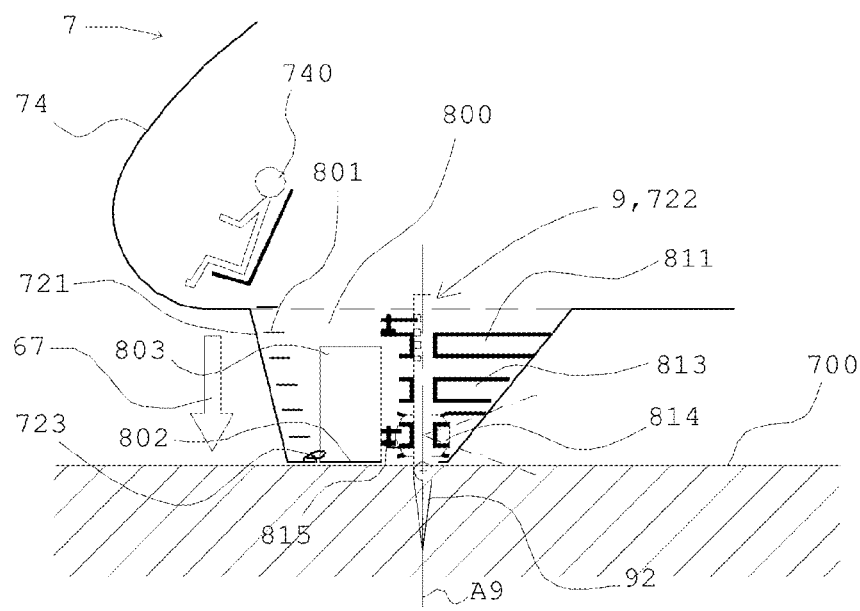
FIG. 10a to FIG. 10c are schematic sectional side views illustrating an example of implementation of an anchoring device for mooring the aircraft in FIG. 7, in a configuration with retractable and expandable punch.
Figure 10B:
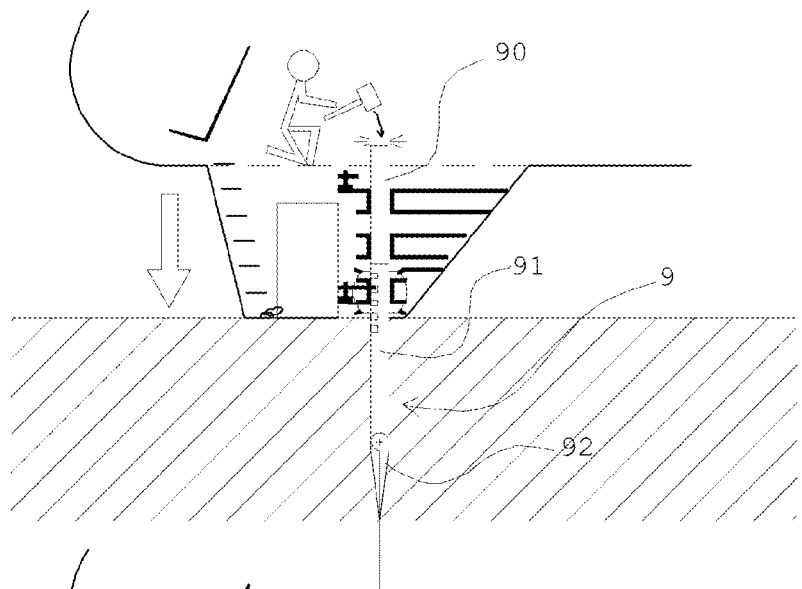
Figure 10C:
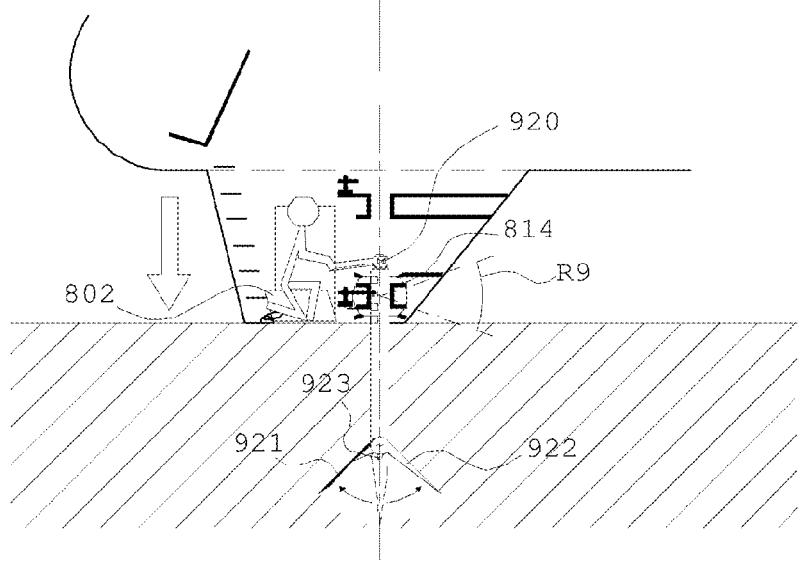

FIGS. 10a to 10c illustrate more particularly its implementation in a landing and mooring procedure made possible by this configuration.

The anchoring device 72 of the airship 7 comprises an anchoring cabin 721 located in the immediate vicinity of the cockpit 74 used for controlling landing.

In FIG. 10a: at the end of the landing procedure described in reference to FIGS. 9a to 9d, the airship is resting on the ground 700. The airship is pinned to the ground via its anchoring cabin 721 by the downward force 67. Its punch 722, in this case in a retractable and expandable configuration 9, comprises a pointed portion 92 extending downwards that has gone into the ground by itself under the effect of this downward force and possibly the inertia of the airship. This pointed portion 92 has in this case an elongation about a vertical plane to form a plate-shaped end. It could also have a point by elongation along a line parallel to the driving axis.

In FIG. 10b: as the airship's situation is stable, the pilot 740 can leave the cockpit 74. In the case of hard ground or of poor initial driving of the punch, it is possible to maintain horizontal immobility dynamically by maintaining a blocked or servoed propulsion regime, for example for two to five minutes, which will make it possible to proceed to the mooring proper.

He releases the catch 812 that held the punch 9 in its retracted position (FIG. 10a), and proceeds to an additional driving of the punch 9 into the ground, for example using a mallet and with the aid of an extension 90. For this, the body 91 of the punch 9 slides downwards through several guides 811, 813 and 814 while the pointed portion 92 is driven into the ground, and can be locked by a catch 815. One or more sliding guides 813 can be detachable, for example to save space in the passage and to reach the operating end 920 of the punch.

In FIG. 10c: the pilot has gone down into the well 800 of the anchoring cabin 721 by the ladder 801, and can reach the ground around the driving point via a trapdoor 802 to check the nature of the ground or for attaching a snap hook 723. Once the punch 9 has been driven in to a satisfactory depth, its pointed portion 92 divides into two parts 921, 922, which bear against the ground to exert a downward anchoring force. This dividing-up is obtained for example by operating the operating head of a threaded rod 920.

The sliding guide or guides 814 that also receive the punch 9 in its driven-in position (FIG. 10c) are attached to the aircraft by device 816 comprising a swivel linkage that is completely free about the driving axis A9 of the punch, and a swivel linkage equipped with stops and possibly shock absorbers and slanted bolts for the angles of inclination R9 along the other two swivel axes. The aircraft can thus swivel freely with the wind, and absorb the permanent or temporary variations of the inclination of the airship relative to the punch and the ground.

Of course, the invention is not limited to the examples which have just been described and numerous adjustments can be made to these examples without exceeding the scope of the invention.

The invention claimed is:

1. An aircraft, of the powered airship type with at least partial buoyancy, comprising:
   an external envelope having a shape defined by a rounded upper portion and a substantially flat bottom face, said shape designed to produce, under the effect of the relative wind, an overall resultant downward force, when said airship is in a horizontal attitude and is distant from the ground by less than a specified distance, with an overall nose-down torque;
   one or more elevators located forward of a centre of aerodynamic drag of the aircraft and arranged to produce, under the effect of the relative wind, a nose-up angle sufficient to produce an upward lifting force capable of reducing or cancelling said overall resultant downward force and said overall nose-down torque;
   a mooring station located under the external envelope, the mooring station including a rigid descent well supporting the aircraft; and
   an anchoring device including connecting means and a punch ending in a pointed or tapered portion, the punch movable between:
      a retracted position inside the descent well and
      an anchoring position where the punch extends below the descent well;
   wherein said connecting means are configured to allow the punch to rotate about a horizontal axis which is perpendicular to a longitudinal axis of the aircraft.

2. The aircraft according to claim 1, wherein the connecting means is arranged for maintaining a constant angle between the aircraft and an axis of said punch during the landing phase.

3. The aircraft according to claim 2, wherein the connecting means are arranged to allow freedom of rotation of said aircraft about an axis that is vertical or transversal to the ground or the axis of the punch or between the two, combined with a rotational displacement about at least one horizontal axis.

4. The aircraft according to claim 3, wherein the punch of the anchoring device is equipped with retaining means situated in an anchoring portion of the punch that is driven into the ground, said retaining means comprising at least two elements movable between at least
   a retracted position, allowing said anchoring portion to be driven into loose soil; and
   an expanded position, where the movable elements are moved away from said anchoring portion so as to exert a force that opposes withdrawal of said anchoring portion when driven into the ground.

5. The aircraft according to claim 1, wherein the mooring station communicates with a cockpit to allow human movement between the cockpit and mooring station and the mooring station communicates with the exterior to allow human disembarkation and/or embarkation of the aircraft;
   said mooring station being arranged sufficiently close to the anchoring means to allow a person to touch the ground at the anchoring point without disembarking from the aircraft.

6. The aircraft according to claim 1, wherein the one or more elevators is a movable aerodynamic control surface.

7. The aircraft according to claim 1, comprising a main body formed from a rigid frame supporting a covering maintained under tension in two transverse directions.

8. The aircraft according to claim 1, wherein the punch ending in a pointed or tapered portion comprises an expandable portion including one or more elements movable between:
   a retracted position wherein the one or more elements are not extending beyond a body section of the punch; and
   an expanded position wherein the one or more elements extend outward of the body section of the punch;
   wherein the one or more elements are brought into the expanded position by bearing on at least a ramp, and by bearing against a nut displaced in translation by translation means.

9. The driving element according to claim 8, wherein the expandable portion comprises one or more movable plates, joined together by a swivel linkage along an axis that is transverse to, a driving axis, and which are moved apart by displacement of said nut moved in translation by a control rod under the effect of a screw-nut mechanism.

10. The driving element according to claim 8, comprising, at one end, at least two movable plates, the free ends of which, in their retracted position, meet together in alignment on at least one cutting line forming a driving end for the pointed portion.

11. The aircraft according to claim 1, wherein the bottom face has a shape having, at least in the front third of the aircraft a region with reduced inclination (S2) the area of which is greater than that of the region with greatest inclination (S1).

12. The aircraft according to claim 11, wherein the region with reduced inclination (S2) having an area greater than that of the region with greatest inclination (S1), with a ratio (R21=S2/S1) having a value of at least 1 and located between
   a bottom surface comprised within a second belt line defined by points of tangency of the envelope with a plane inclined at 45.degree. to the horizontal, and
   an intermediate surface, comprised between said second belt line and a first belt line defined by the points of tangency of the envelope with a vertical plane.

13. An aircraft, of the powered airship type with at least partial buoyancy, comprising:
   an external envelope having a shape defined by a rounded upper portion and a substantially flat bottom face, said shape designed to produce, under the effect of the relative wind, an overall resultant downward force, when said airship is in a horizontal attitude and is distant from the ground by less than a specified distance, with an overall nose-down torque;
   one or more elevators located forward of a centre of aerodynamic drag of the aircraft and arranged to produce, under the effect of the relative wind, a nose-up angle sufficient to produce an upward lifting force capable of reducing or cancelling said overall resultant downward force and said overall nose-down torque;
   a mooring station located under both the external envelope and a front cockpit, the mooring station including a rigid descent well supporting the aircraft; and
   an anchoring device including connecting means and a punch ending in a pointed or tapered portion, the punch movable between:
   a retracted position inside the descent well and
   an anchoring position where the punch extends below the descent well;
   wherein said rigid descent well is in communication with the front cockpit to allow a pilot to move from the cockpit into the rigid descent well.

* * * * *